(12) United States Patent
Minami

(10) Patent No.: US 8,950,923 B2
(45) Date of Patent: *Feb. 10, 2015

(54) LIGHT SOURCE DEVICE AND DISPLAY

(71) Applicant: Sony Corporation, Tokyo (JP)

(72) Inventor: Masaru Minami, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/138,236

(22) Filed: Dec. 23, 2013

(65) Prior Publication Data

US 2014/0111714 A1    Apr. 24, 2014

Related U.S. Application Data

(63) Continuation of application No. 13/351,401, filed on Jan. 17, 2012.

(30) Foreign Application Priority Data

Jan. 27, 2011    (JP) ................................ 2011-015569

(51) Int. Cl.
| | |
|---|---|
| *F21V 7/04* | (2006.01) |
| *G02F 1/1335* | (2006.01) |
| *F21V 8/00* | (2006.01) |
| *G02B 27/22* | (2006.01) |

(52) U.S. Cl.
CPC ............ *G02F 1/1336* (2013.01); *G02B 6/0043* (2013.01); *G02B 27/2214* (2013.01)
USPC .......................................... 362/613; 362/612

(58) Field of Classification Search
USPC ........................................................ 362/613
See application file for complete search history.

(56) References Cited

U.S. PATENT DOCUMENTS

| | | | |
|---|---|---|---|
| 4,673,254 | A | 6/1987 | Kato et al. |
| 5,575,549 | A | 11/1996 | Ishikawa et al. |
| 5,897,184 | A | 4/1999 | Eichenlaub et al. |
| 5,956,107 | A | 9/1999 | Hashimoto et al. |
| 5,991,073 | A | 11/1999 | Woodgate et al. |
| 6,144,424 | A | 11/2000 | Okuda et al. |
| 6,447,132 | B1 | 9/2002 | Harter, Jr. |
| 7,356,211 | B2 | 4/2008 | Sugiura et al. |

(Continued)

FOREIGN PATENT DOCUMENTS

| | | |
|---|---|---|
| JP | 62-029003 A | 7/1987 |
| JP | 01-241590 A | 9/1989 |

(Continued)

*Primary Examiner* — Mary Ellen Bowman
(74) *Attorney, Agent, or Firm* — Wolf, Greenfield & Sacks, P.C.

(57) ABSTRACT

A light source device includes: a light guide plate having a first internal reflection plane and a second internal reflection plane which face each other; one or more light sources each applying illumination light through a side surface of the light guide plate into an interior thereof; and an optical device disposed to face the light guide plate, and modulating, for each of partial regions thereof, a state of light rays exiting therefrom. One or both of the first and the second internal reflection planes each have scattering regions each allowing the illumination light from the light sources to be scattered and exit from the first internal reflection plane of the light guide plate, and one or both of the first and second internal reflection planes each have total-reflection regions allowing the illumination light from the light sources to be reflected in a manner of total-internal-reflection.

12 Claims, 12 Drawing Sheets

(56) References Cited

U.S. PATENT DOCUMENTS

| | | |
|---|---|---|
| 7,507,011 B2 | 3/2009 | Ueno et al. |
| 7,525,531 B2 | 4/2009 | Ogiwara et al. |
| 7,876,397 B2 | 1/2011 | Krijn et al. |
| 7,920,226 B2 | 4/2011 | Mather et al. |
| 8,033,706 B1 | 10/2011 | Kelly et al. |
| 2008/0204550 A1 | 8/2008 | De Zwart et al. |
| 2010/0091354 A1 | 4/2010 | Nam et al. |
| 2010/0110340 A1 | 5/2010 | Mather et al. |
| 2010/0157200 A1 | 6/2010 | Mun et al. |
| 2011/0205448 A1 | 8/2011 | Takata |
| 2011/0242411 A1 | 10/2011 | Auer et al. |
| 2011/0242441 A1 | 10/2011 | Minami |
| 2012/0014136 A1 | 1/2012 | Lee et al. |
| 2012/0075698 A1 | 3/2012 | Minami |
| 2012/0105767 A1 | 5/2012 | Choi et al. |
| 2012/0195072 A1 | 8/2012 | Minami |
| 2012/0256974 A1 | 10/2012 | Minami |
| 2012/0257406 A1 | 10/2012 | Minami |
| 2012/0275183 A1 | 11/2012 | Minami |
| 2012/0306861 A1 | 12/2012 | Minami |
| 2013/0057537 A1 | 3/2013 | Hong et al. |
| 2013/0076999 A1 | 3/2013 | Minami |
| 2013/0083260 A1 | 4/2013 | Minami |
| 2013/0105767 A1 | 5/2013 | Lin et al. |
| 2013/0114292 A1 | 5/2013 | Brick et al. |
| 2014/0160562 A1 | 6/2014 | Minami |

FOREIGN PATENT DOCUMENTS

| | | |
|---|---|---|
| JP | 03-011502 A | 1/1991 |
| JP | 10-097199 A | 4/1998 |
| JP | 10-508151 A | 4/1998 |
| JP | 3565391 B2 | 6/2004 |
| JP | 2004-240294 A | 8/2004 |
| JP | 2004-279815 A | 10/2004 |
| JP | 2007-507071 A | 3/2007 |
| JP | 2007-187823 A | 7/2007 |
| JP | 2007-242336 A | 9/2007 |
| JP | 2007-272994 A | 10/2007 |
| JP | 2007-279224 A | 10/2007 |
| JP | 2009-176593 A | 8/2009 |
| WO | WO 2010/024647 A2 | 3/2010 |

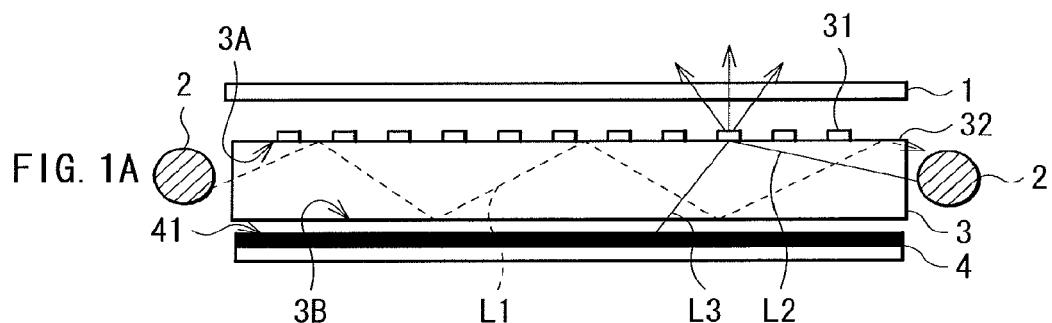
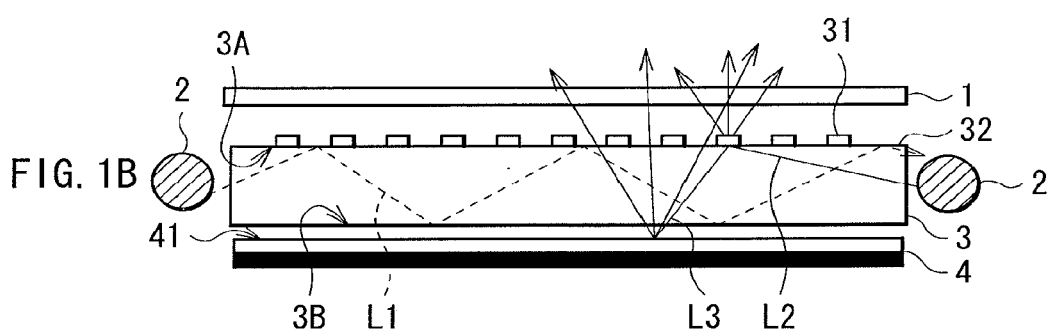
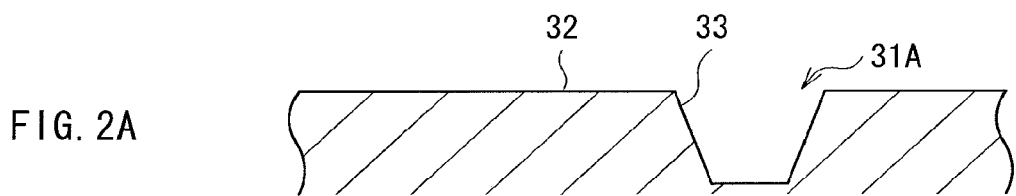
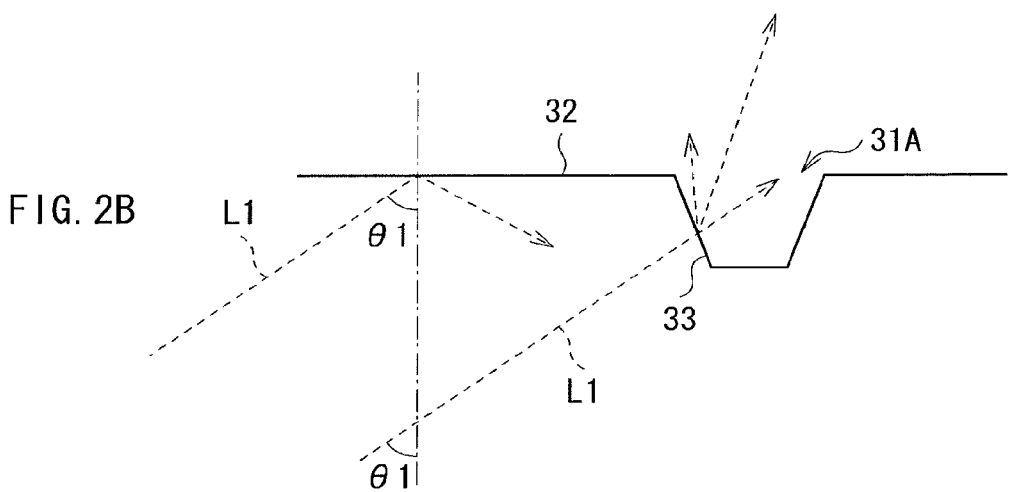

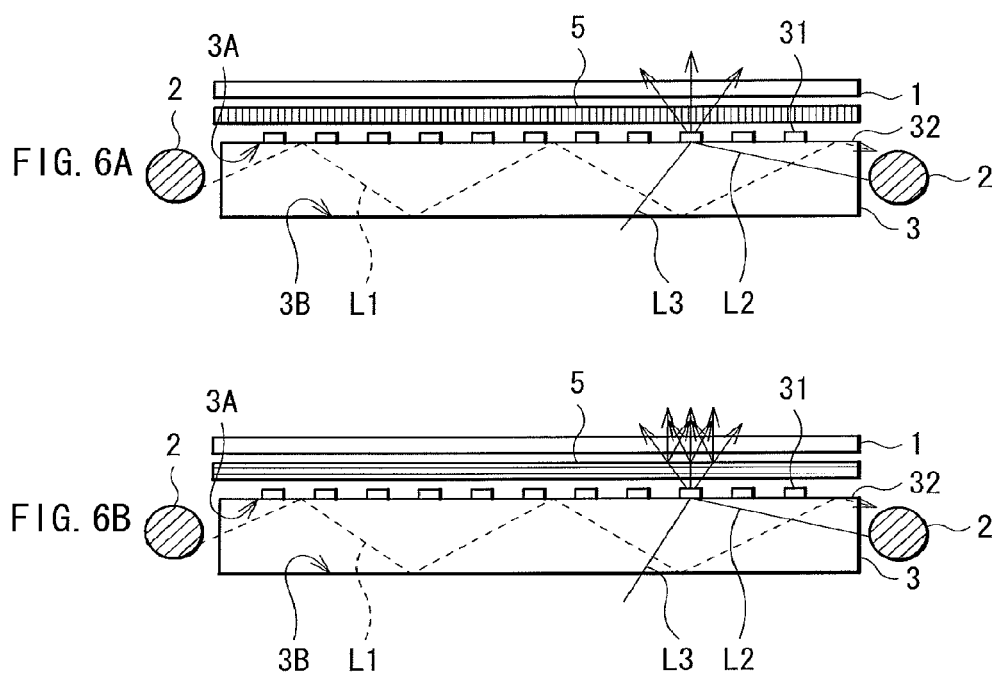

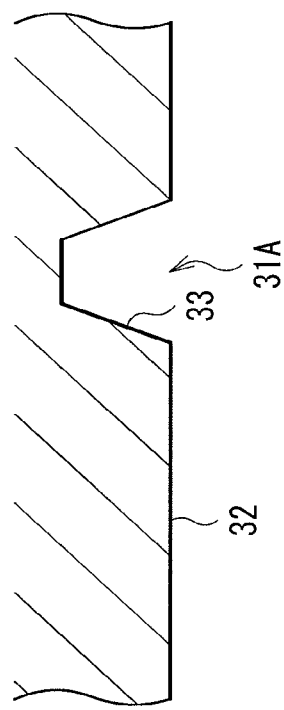
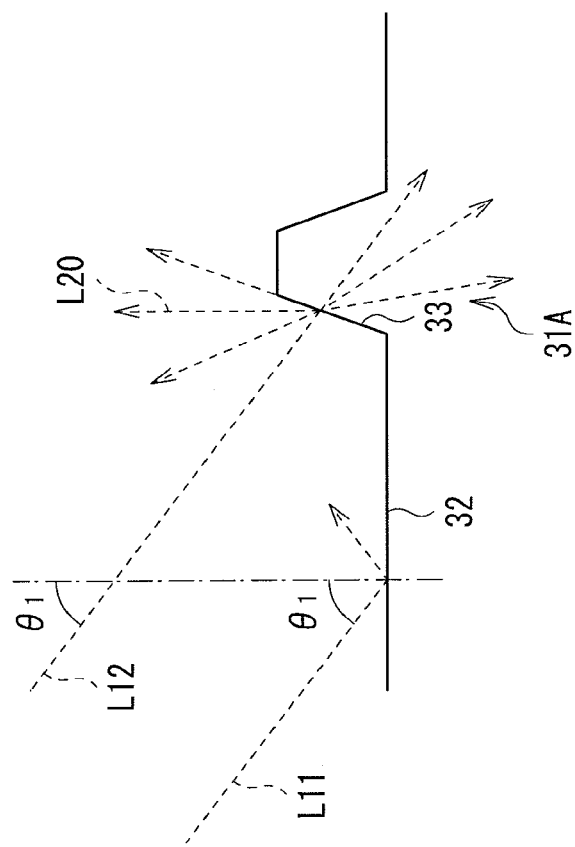
FIG. 11A
FIG. 11B

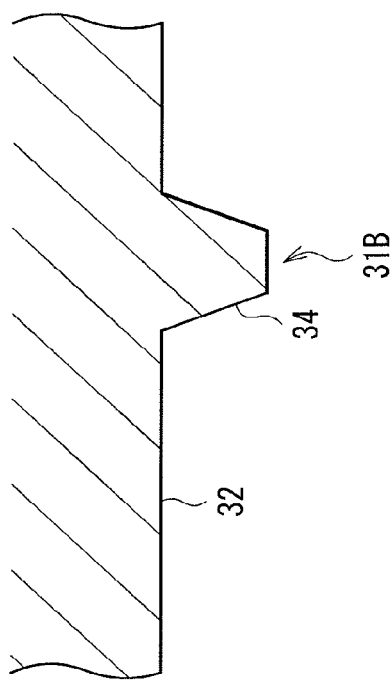
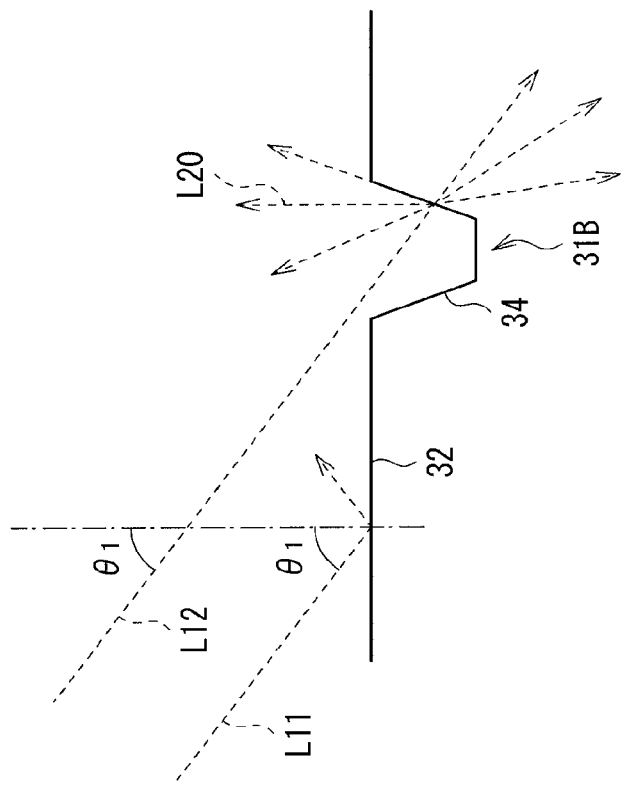
FIG. 12A
FIG. 12B

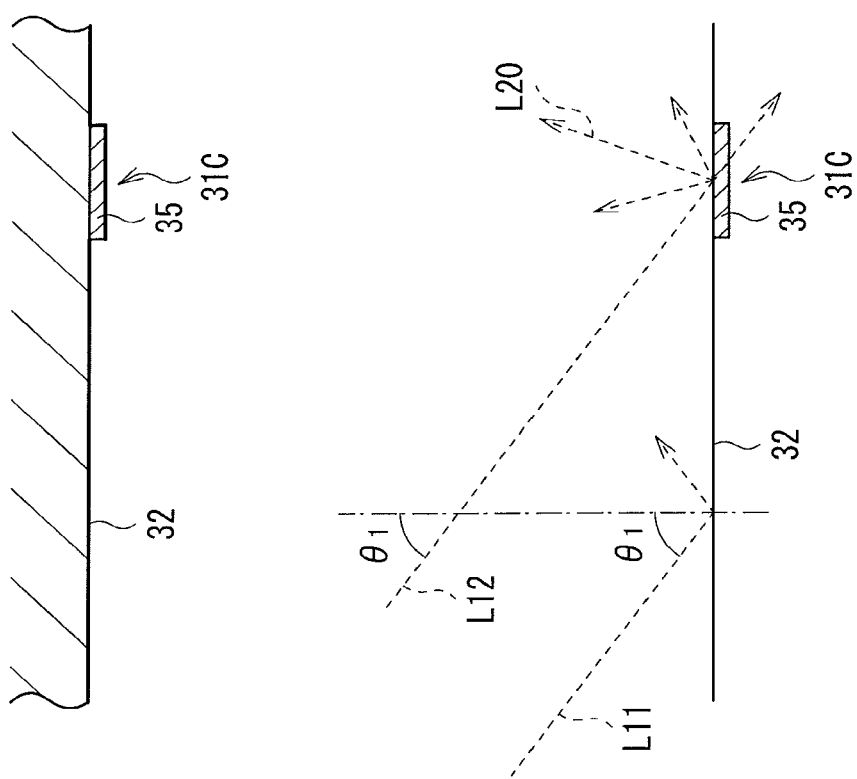

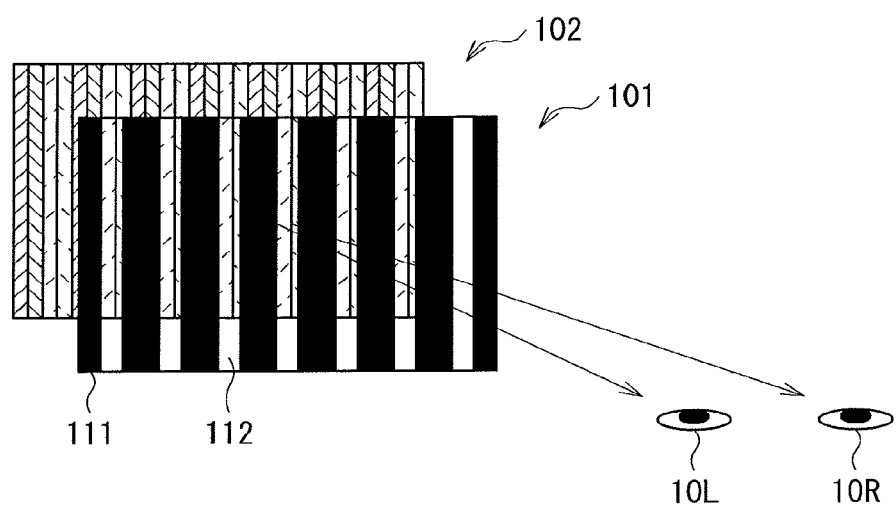
F I G. 14

LIGHT SOURCE DEVICE AND DISPLAY

RELATED APPLICATIONS

This application is a continuation of U.S. patent application Ser. No. 13/351,401, entitled "LIGHT SOURCE DEVICE AND DISPLAY," filed Jan. 17, 2012, which claims priority and benefit under 35 U.S.C. §119 of Japanese Patent Application Serial No. 2011-015569, filed in the Japan Patent Office on Jan. 27, 2011, all of which are hereby incorporated by reference to the maximum extent allowable by law.

BACKGROUND

The present technology relates to a light source device and a display capable of achieving stereoscopic vision by a parallax barrier system.

In related art, as one of stereoscopic display systems which are allowed to achieve stereoscopic vision with naked eyes without wearing special glasses, a parallax barrier system stereoscopic display is known. FIG. 14 illustrates a typical configuration example of the parallax barrier system stereoscopic display. In the stereoscopic display, a parallax barrier 101 is disposed to face a front surface of a two-dimensional display panel 102. In a typical configuration of the parallax barrier 101, shielding sections 111 shielding display image light from the two-dimensional display panel 102 and stripe-shaped opening sections (slit sections) 112 allowing the display image light to pass therethrough are alternately arranged in a horizontal direction.

An image based on three-dimensional image data is displayed on the two-dimensional display panel 102. For example, a plurality of parallax images including different parallax information, respectively, are prepared as three-dimensional image data, and each of the parallax images are separated into, for example, a plurality of stripe-shaped separated images extending in a vertical direction. Then, the separated images of the plurality of parallax images are alternately arranged in a horizontal direction to produce a composite image including a plurality of stripe-shaped parallax images in one screen, and the composite image is displayed on the two-dimensional display panel 102. In the case of the parallax barrier system, the composite image displayed on the two-dimensional display panel 102 is viewed through the parallax barrier 101. When the widths of the separated images to be displayed, a slit width in the parallax barrier 101, and the like are appropriately set, in the case where a viewer watches the stereoscopic display from a predetermined position and a predetermined direction, light rays from different parallax images are allowed to enter into left and right eyes 10L and 10R of the viewer, respectively, through the slit sections 112. Thus, when the viewer watches the stereoscopic display from a predetermined position and a predetermined direction, a stereoscopic image is perceived. To achieve stereoscopic vision, it is necessary for the left and right eyes 10L and 10R to view different parallax images, respectively, so two or more parallax images, that is, an image for left eye and an image for right eye are necessary. In the case where three or more parallax images are used, multi-view vision is achievable. When more parallax images are used, stereoscopic vision in response to changes in viewing position of the viewer is achievable. In other words, motion parallax is obtained.

In the configuration example in FIG. 14, the parallax barrier 101 is disposed in front of the two-dimensional display panel 102. For example, in the case where a transparent liquid crystal display panel is used, the parallax barrier 101 may be disposed behind the two-dimensional display panel 102 (refer to FIG. 10 in Japanese Patent No. 3565391 and FIG. 3 in Japanese Unexamined Patent Application Publication No. 2007-187823). In this case, when the parallax barrier 101 is disposed between the transmissive liquid crystal display panel and a backlight, stereoscopic display is allowed to be performed based on the same principle as that in the configuration example in FIG. 14.

SUMMARY

However, in a parallax barrier system stereoscopic display, an exclusive component for three-dimensional display, i.e., a parallax barrier is necessary, and there is an issue that the number of components and an arrangement space are larger than those in a display for two-dimensional display.

It is desirable to provide a light source device and a display which include a smaller number of components than a parallax barrier system stereoscopic display in related art, and are capable of achieving space saving.

According to an embodiment of the technology, there is provided a light source device including: a light guide plate having a first internal reflection plane and a second internal reflection plane which face each other; one or more light sources each applying illumination light through a side surface of the light guide plate into an interior thereof; and an optical device disposed to face the light guide plate, and modulating, for each of partial regions thereof, a state of light rays exiting therefrom, in which one or both of the first internal reflection plane and the second internal reflection plane each have scattering regions each allowing the illumination light from the light sources to be scattered and exit from the first internal reflection plane of the light guide plate, and one or both of the first and second internal reflection planes, which are planes having the scattering regions, each have total-reflection regions allowing the illumination light from the light sources to be reflected in a manner of total-internal-reflection.

According to an embodiment of the technology, there is provided a display including: a display section displaying an image; and a light source device emitting light for image display to the display section, in which the light source device is configured of the light source device according to the above-described embodiment of the technology.

In the light source device or the display according to the embodiment of the technology, in one or both of the first internal reflection plane and the second internal reflection plane in the light guide plate, the total-reflection regions allow illumination light from the light sources to be reflected in a manner of total-internal-reflection. Therefore, the illumination light having entered the total-reflection regions is totally reflected in the interior of the light guide plate between the first internal reflection plane and the second internal reflection plane. On the other hand, the scattering regions allow the illumination light from the light sources to be scattered, and to exit from the first internal reflection plane of the light guide plate. Moreover, the optical device controls a state of a light ray exiting therefrom for each of partial regions thereof. Therefore, the light guide plate is allowed to have a function as a parallax barrier. In other words, the light guide plate is allowed to equivalently function as a parallax barrier with the scattering regions as opening sections (slit sections) and the total-reflection regions as shielding sections.

In the light source device or the display according to the embodiment of the technology, one or both of the first internal reflection plane and the second internal reflection plane of the light guide plate each have the total-reflection regions and the scattering regions; therefore, the light guide plate is allowed to equivalently have a function as a parallax barrier. Thus, compared to a parallax barrier system stereoscopic display in related art, the number of components is allowed to be reduced, and space saving is achievable. Moreover, the optical device is allowed to control the state of the light ray exiting therefrom for each of partial regions thereof; therefore, the function as the parallax barrier is controllable for each of partial regions. Thus, display switching between three-dimensional display and two-dimensional display is controllable for each of partial regions.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 1A and 1B are sectional views illustrating a configuration example of a stereoscopic display according to a first embodiment of the technology with states of emission of light rays from a light source device, where FIG. 1A illustrates a light ray exiting state during three-dimensional display, and FIG. 1B illustrates a light ray exiting state during two-dimensional display.

FIGS. 2A and 2B are a sectional view illustrating a first configuration example of a light guide plate surface in the stereoscopic display illustrated in FIGS. 1A and 1B, and a schematic explanatory diagram illustrating reflection and scattering states of light rays on the light guide plate surface illustrated in FIG. 2A, respectively.

FIGS. 6A and 6B are sectional views illustrating a configuration example of a stereoscopic display according to a second embodiment of the technology with a state of light rays exiting from a light source device, where FIG. 6A illustrates a light ray exiting state during three-dimensional display, and FIG. 6B illustrates a light ray exiting state during two-dimensional display.

FIG. 7A illustrates a light ray exiting state during three-dimensional display, and FIG. 7B illustrates a light ray exiting state during two-dimensional display.

FIGS. 11A and 11B are a sectional view illustrating a first configuration example of a light guide plate surface in the stereoscopic display illustrated in FIG. 8, and a schematic explanatory diagram illustrating scattering and reflection states of light rays on the light guide plate surface illustrated in FIG. 11A, respectively.

FIGS. 12A and 12B are a sectional view illustrating a second configuration example of the light guide plate surface in the stereoscopic display illustrated in FIG. 8, and a schematic explanatory diagram illustrating scattering and reflection states of light rays on the light guide plate surface illustrated in FIG. 12A, respectively.

FIGS. 13A and 13B are a sectional view illustrating a third configuration example of the light guide plate surface in the stereoscopic display illustrated in FIG. 8, and a schematic explanatory diagram illustrating scattering and reflection states of light rays on the light guide plate surface illustrated in FIG. 13A, respectively.

FIG. 14 is a configuration diagram illustrating a typical configuration example of a parallax barrier system stereoscopic display.

DETAILED DESCRIPTION OF THE PREFERRED EMBODIMENTS

Figure 3A:
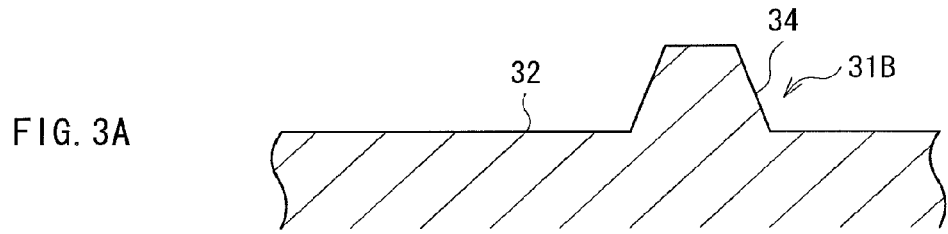
FIGS. 3A and 3B are a sectional view illustrating a second configuration example of the light guide plate surface in the stereoscopic display illustrated in FIGS. 1A and 1B, and a schematic explanatory diagram illustrating reflection and scattering states of light rays on the light guide plate surface illustrated in FIG. 3A, respectively.

Preferred embodiments of the technology will be described in detail below referring to the accompanying drawings.
(First Embodiment)
[Whole Configuration of Stereoscopic Display]

FIGS. 1A and 1B illustrate a configuration example of a stereoscopic display according to a first embodiment of the technology. The stereoscopic display includes a display section 1 which displays an image, and a light source device which is disposed on a back surface of the display section 1 and emits light for image display toward the display section 1. The light source device includes a light source 2, a light guide plate 3, and an electronic paper 4.

The stereoscopic display is allowed to selectively perform switching between a two-dimensional (2D) display mode on an entire screen and a three-dimensional (3D) display mode on the entire screen as necessary. FIGS. 1A and 1B correspond to a configuration in the three-dimensional display mode and a configuration in the two-dimensional display mode, respectively. FIGS. 1A and 1B schematically illustrate states of emission of light rays from the light source device in respective display modes.

The display section 1 is configured with use of a transmissive two-dimensional display panel, for example, a transmissive liquid crystal display panel, and includes a plurality of pixels configured of, for example, R (red) pixels, G (green) pixels and B (blue) pixels, and the plurality of pixels are arranged in a matrix form. The display section 1 displays a two-dimensional image by modulating light from the light source device from one pixel to another based on image data. The display section 1 selectively displays one of an image based on three-dimensional image data and an image based on two-dimensional image data as necessary by switching. It is to be noted that the three-dimensional image data is, for example, data including a plurality of parallax images corresponding to a plurality of viewing angle directions in three-dimensional display. For example, in the case where binocular three-dimensional display is performed, the three-dimensional image data is data including parallax images for right-eye display and left-eye display. In the case where three-dimensional display mode display is performed, as in the case of a parallax barrier system stereoscopic display in related art illustrated in FIG. 14, for example, a composite image including a plurality of stripe-shaped parallax images in one screen is produced and displayed.

The electronic paper 4 is disposed to face a side where a second internal reflection plane 3B is formed of the light guide plate 3. The electronic paper 4 is an optical device allowed to selectively switch a function performed on an incident light ray to one of two modes, i.e., a light absorption mode and a scattering-reflection mode. The electronic paper 4 is configured of a particle migration type display by an electrophoresis system or an electronic liquid powder system. In the particle migration type display, for example, positively-charged black particles and negatively-charged white particles are dispersed between a pair of facing substrates, and the particles are moved in response to a voltage applied between the substrates to perform black display or white display. Specifically in the electrophoresis system, the particles are dispersed in a solution, and in the electronic liquid powder system, the particles are dispersed in a gas. The above-described light absorption mode corresponds to the case where a display surface 41 of the electronic paper 4 is in an all-black display mode as illustrated in FIG. 1A, and the scattering-reflection mode corresponds to the case where the display surface 41 of the electronic paper 4 is in an all-white display mode as illustrated in FIG. 1B. In the case where an image based on three-dimensional image data is displayed on the display section 1 (in the case where the three-dimensional display mode is selected), the electronic paper 4 switches the function performed on an incident light ray to the light absorption mode. In the case where an image based on two-dimensional image data is displayed on the display section 1 (in the case where the two-dimensional mode is selected), the electronic paper 4 switches the function performed on an incident light ray to the scattering-reflection mode.

The light source 2 is configured with use of, for example, a fluorescent lamp such as a CCFL (Cold Cathode Fluorescent Lamp), or an LED (Light Emitting Diode). One or more light sources 2 are disposed on a side surface of the light guide plate 3, and are allowed to apply illumination light (light rays L1) from a side surface direction of the light guide plate 3 into an interior thereof. In FIGS. 1A and 1B, a configuration example in which the light sources 2 are disposed on both side surfaces of the light guide plate 3 is illustrated.

The light guide plate 3 is configured of a transparent plastic plate of, for example, an acrylic resin. The light guide plate 3 includes a first internal reflection plane 3A facing the display section 1 and a second internal reflection plane 3B facing the electronic paper 4. The light guide plate 3 guides light rays from the light source 2 to a side surface direction in a manner of total-internal-reflection between the first internal reflection plane 3A and the second internal reflection plane 3B.

The entire second internal reflection plane 3B is mirror-finished, and allows light rays L1 incident at an incident angle $\theta 1$ satisfying a total-reflection condition to be reflected in a manner of total-internal-reflection. The first internal reflection plane 3A includes scattering regions 31 and total-reflection regions 32. In the first internal reflection plane 3A, the total-reflection regions 32 and the scattering regions 31 are alternately arranged in, for example, a stripe pattern forming a configuration corresponding to a parallax barrier. In other words, as will be described later, in the three-dimensional display mode, the light guide plate 3 is configured to function as a parallax barrier with the scattering region 31 as an opening section (slit section) and the total-reflection region 32 as a shielding section.

The total-reflection region 32 reflects the light rays L1 incident at the incident angle $\theta 1$ satisfying the total-reflection condition in a manner of total-internal-reflection (reflects the light rays L1 incident at the incident angle $\theta 1$ larger than a predetermined critical angle $\alpha$ in a manner of total-internal-reflection). The scattering region 31 allows some or all of light rays incident at an angle corresponding to the incident angle $\theta 1$ satisfying a predetermined total-reflection condition in the total-reflection region 32 in incident light rays L2 to exit (allows some or all of light rays incident at an angle corresponding to the incident angle $\theta 1$ larger than the predetermined critical angle $\alpha$ to exit). Moreover, in the scattering region 31, some other light rays L3 in the incident light rays L2 are internally reflected.

It is to be noted that the critical angle $\alpha$ is represented as follow, where the refractive index of the light guide plate 3 is $n1$, and the refractive index of a medium (an air layer) outside the light guide plate 3 is $n0$ ($<n1$). The angles $\alpha$ and $\theta 1$ are angles with respect to a normal to a surface of the light guide plate. The incident angle $\theta 1$ satisfying the total-reflection condition is $\theta 1 > \alpha$.

$$\sin \alpha = n0/n1$$

[Specific Configuration Example of Scattering Region 31]

FIG. 2A illustrates a first configuration example of a surface of the light guide plate 3. FIG. 2B schematically illustrates reflection and scattering states of light rays on the surface of the light guide plate 3 illustrated in FIG. 2A. In the first configuration example, the scattering region 31 is a recessed scattering region 31A with respect to the total-reflection region 32. Such a recessed scattering region 31A is allowed to be formed, for example, by performing mirror-finishing on the surface of the light guide plate 3, and then performing laser processing on a part corresponding to the scattering region 31A. In the case of such a recessed scattering region 31A, some or all of light rays incident at an angle corresponding to the incident angle $\theta 1$ satisfying the predetermined total-reflection condition in the total-reflection region 32 in incident light rays do not satisfy the total-reflection condition in a recessed side surface section 33, and the light rays exit.

Figure 3B:
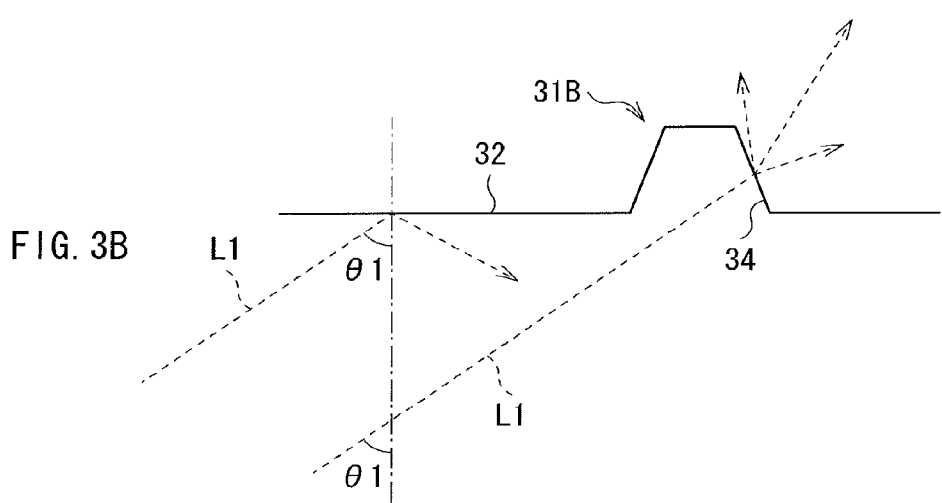

FIG. 3A illustrates a second configuration example of the surface of the light guide plate 3. FIG. 3B schematically illustrates reflection and scattering states of light rays on the surface of the light guide plate 3 illustrated in FIG. 3A. In the second configuration example, the scattering region 31 is a projected scattering region 31B with respect to the total-reflection region 32. Such a projected scattering region 31B is allowed to be formed, for example, by molding the surface of the light guide plate 3 by a die. In this case, a part corresponding to the total-reflection region 32 is mirror-finished by a surface of the die. In the case of such a projected scattering region 31B, some or all of light rays incident at an angle corresponding to the incident angle $\theta 1$ satisfying the predetermined total-reflection condition in the total-reflection region 32 in incident light rays do not satisfy the total-reflection condition in a projected side surface section 34, and the light rays exit.

Figure 4A:
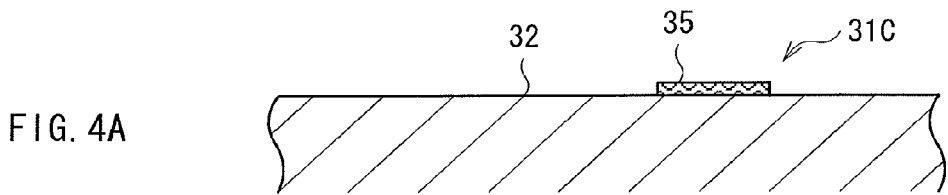
FIGS. 4A and 4B are a sectional view illustrating a third configuration example of the light guide plate surface in the stereoscopic display illustrated in FIGS. 1A and 1B, and a schematic explanatory diagram illustrating reflection and scattering states of light rays on the light guide plate surface illustrated in FIG. 4A, respectively.
Figure 4B:
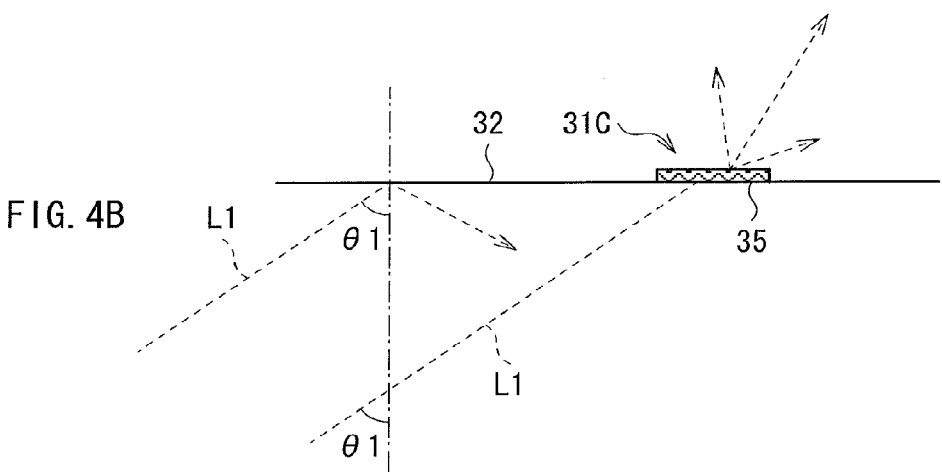

FIG. 4A illustrates a third configuration example of the surface of the light guide plate 3. FIG. 4B schematically illustrates reflection and scattering states of light rays on the surface of the light guide plate 3 illustrated in FIG. 4A. In the configuration examples in FIGS. 2A and 3A, the surface of the light guide plate 3 is processed into a geometry different from that of the total-reflection region 32 to form the scattering region 31. On the other hand, in a scattering region 31C in the configuration example in FIG. 4A, instead of processing the surface of the light guide plate 3, a light-scattering member 35 is disposed on a surface, corresponding to the first internal reflection plane 3A, of the light guide plate 3. As the light-scattering member 35, a member having a refractive index higher than the refractive index of the light guide plate 3, for example, a PET resin with a refractive index of approximately 1.57 is allowed to be used. For example, a scattering sheet formed of the PET resin is bonded to the surface of the light guide plate 3 with use of an acrylic adhesive to form the scattering region 31C. In the case of the scattering region 31C in which such a light-scattering member 35 is disposed, as the refractive index is changed by the light-scattering member 35, some or all of light rays incident at an angle corresponding to the incident angle θ1 satisfying the predetermined total-reflection condition in the total-reflection region 32 in incident light rays do not satisfy the total-reflection condition, and the light rays exit.

The configuration of the scattering region 31 is not limited to the above-described configuration examples, and other configuration examples are considered. For example, the scattering region 31 is allowed to be formed by a method such as subjecting a part corresponding to the scattering region 31 of the surface of the light guide plate 3 to sandblast processing, painting, or the like.

[Operation of Stereoscopic Display]

In the case where the stereoscopic display performs three-dimensional display mode display (refer to FIG. 1A), the display section 1 displays an image based on the three-dimensional image data, and controls an display surface 41 of the electronic paper 4 to be in the all-black display mode (the light absorption mode). In this state, light rays from the light source 2 are reflected repeatedly in a manner of total-internal-reflection between the total-reflection region 32 of the first internal reflection plane 3A and the second internal reflection plane 3B in the light guide plate 3 to be guided from a side surface where the light source 2 is disposed to the other side surface facing the side surface and emitted from the other side surface. On the other hand, some light rays out of the total-reflection condition in the light rays L2 having entered the scattering region 31 of the first internal reflection plane 3A in the light guide plate 3 exit from the scattering region 31. In the scattering region 31, some other light rays L3 are also internally reflected, but the light rays L3 enter the display surface 41 of the electronic paper 4 through the second internal reflection plane 3B of the light guide plate 3. In this case, the display surface 41 of the electronic paper 4 is in the all-black display mode; therefore, the light rays L3 are absorbed by the display surface 41. As a result, light rays exit only from the scattering region 31 of the first internal reflection plane 3A in the light guide plate 3. In other words, the light guide plate 3 is allowed to equivalently function as a parallax barrier with the scattering region 31 as an opening section (slit section) and the total-reflection region 32 as a shielding section. Therefore, three-dimensional display by a parallax barrier system in which the parallax barrier is equivalently disposed on a back surface of the display section 1 is performed.

On the other hand, in the case where two-dimensional display mode display is performed (refer to FIG. 1B), the display section 1 displays an image based on the two-dimensional image data, and controls the display surface 41 of the electronic paper 4 to be in the all-white display mode (the scattering-reflection mode). In this state, light rays from the light source 2 are reflected repeatedly in a manner of total-internal-reflection between the total-reflection region 32 of the first internal reflection plane 3A and the second internal reflection plane 3B in the light guide plate 3 to be guided from a side surface where the light source 2 is disposed to the other side surface facing the side surface and emitted from the other side surface. On the other hand, in the light guide plate 3, some light rays out of the total-reflection condition in the light rays L2 having entered the scattering region 31 of the first internal reflection plane 3A exit from the scattering region 31. In the scattering region 31, some other light rays L3 are also internally reflected, but the light rays L3 enter the display surface 41 of the electronic paper 4 through the second internal reflection plane 3B of the light guide plate 3. In this case, the display surface 41 of the electronic paper 4 is in the all-white display mode; therefore, the light rays L3 are scattered and reflected by the display surface 41. The light rays scattered and reflected by the display surface 41 enter the light guide plate 3 through the second internal reflection plane 3B again, and the incident angle of the light rays is out of the total-reflection condition in the total-reflection region 32, and the light rays exit from not only the scattering region 31 but also the total-reflection region 32. As a result, light rays exit from the entire first internal reflection plane 3A in the light guide plate 3. In other words, the light guide plate 3 functions as a planar light source similar to a typical backlight. Therefore, two-dimensional display by a backlight system in which a typical backlight is equivalently disposed on a back surface of the display section 1 is performed.

Figure 5:
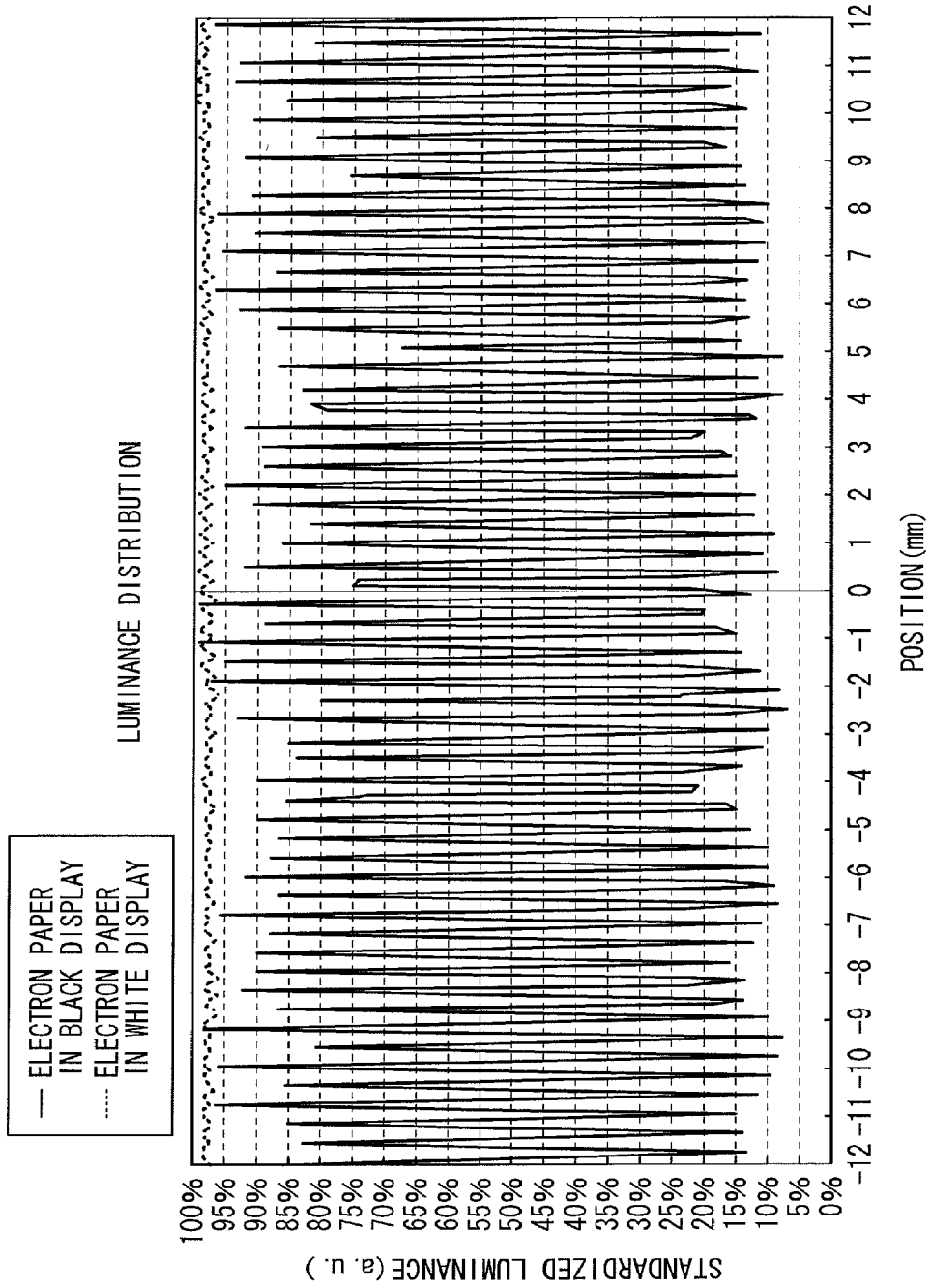
FIG. 5 is a plot illustrating an example of luminance distributions on a surface of a display section during three-dimensional display and two-dimensional display in the stereoscopic display illustrated in FIGS. 1A and 1B.

FIG. 5 illustrates an example of luminance distributions on the surface of the display section 1 during three-dimensional display and two-dimensional display in the stereoscopic display illustrated in FIG. 1. Three-dimensional display corresponds to a state where black is displayed on the electronic paper 4, and two-dimensional display corresponds to a state where white is displayed on the electronic paper 4. It is to be noted that a uniform image is displayed on the entire surface of the display section 1. In FIG. 5, a horizontal axis indicates a position (mm) in a horizontal direction on a screen of the display section 1, and a vertical axis indicates a standardized luminance value (arbitrary unit (a.u.)). It is obvious from FIG. 5 that in a state where white is displayed on the electronic paper 4, uniform luminance is obtained on the entire screen. In a state where black is displayed on the electronic paper 4, luminance varies with position, and a luminance distribution equivalent to that in the case where a parallax barrier is arranged is obtained.

As described above, in the stereoscopic display using the light source device according to the embodiment, as the first internal reflection plane 3A of the light guide plate 3 includes the total-reflection region 32 and the scattering region 31, the light guide plate 3 is allowed to equivalently function as a parallax barrier. Therefore, compared to the parallax barrier system stereoscopic display in related art, the number of components is allowed to be reduced, and space saving is achievable. Moreover, switching between the two-dimensional display mode and the three-dimensional display mode is allowed to be easily performed only by switching the display mode of the electronic paper 4.

(Second Embodiment)

Next, a stereoscopic display according to a second embodiment of the technology will be described below. It is to be noted that like components are denoted by like numerals as of the stereoscopic display according to the first embodiment, and will not be further described.

FIGS. 6A and 6B illustrate a configuration example of the stereoscopic display according to the second embodiment of the technology. As in the case of the stereoscopic display in FIGS. 1A and 1B, the stereoscopic display is allowed to selectively perform switching between the two-dimensional display mode and the three-dimensional display mode as necessary. FIGS. 6A and 6B correspond to a configuration in the three-dimensional display mode, and a configuration in the two-dimensional display mode, respectively. FIGS. 6A and 6B also schematically illustrate states of emission of light rays from the light source device in respective display modes.

The stereoscopic display includes a polymer diffuser plate 5 instead of the electronic paper 4 in the stereoscopic display in FIGS. 1A and 1B. Other configurations are the same as those in the stereoscopic display in FIGS. 1A and 1B. The polymer diffuser plate 5 is configured with use of a polymer-dispersed liquid crystal. The polymer diffuser plate 5 is disposed to face a surface corresponding to the first internal reflection plane 3A of the light guide plate 3. The polymer diffuser plate 5 is an optical device allowed to selectively switch a function performed on an incident light ray to one of two modes, i.e., a transparent transmission mode and a diffuse transmission mode.

In the case where the stereoscopic display performs three-dimensional display mode display (refer to FIG. 6A), the display section 1 displays an image based on the three-dimensional image data, and controls an entire surface of the polymer diffuser plate 5 to be in the transparent transmission mode. In this state, light rays from the light source 2 are reflected repeatedly in a manner of total-internal-reflection between the total-reflection region 32 of the first internal reflection plane 3A and the second internal reflection plane 3B in the light guide plate 3 to be guided from a side surface where the light source 2 is disposed to the other side surface facing the side surface and emitted from the other side surface. On the other hand, some light rays out of the total-reflection condition in the light rays L2 having entered the scattering region 31 of the first internal reflection plane 3A in the light guide plate 5 exit from the scattering region 31. The light rays having exited through the scattering region 31 enter the polymer diffuser plate 5; however, the entire surface of the polymer diffuser plate 5 is in the transparent transmission mode; therefore, while the emission angle of the light rays from the scattering region 31 is maintained, the light rays enter the display section 1 through the polymer diffuser plate 5. In the scattering region 31, some other light rays L3 are also internally reflected, but the light rays L3 exit through the second internal reflection plane 3B of the light guide plate 3, and do not contribute to display of an image. As a result, light rays exit only from the scattering region 31 of the first internal reflection plane 3A in the light guide plate 3. In other words, the surface of the light guide plate 3 is allowed to equivalently function as a parallax barrier with the scattering region 31 as an opening section (slit section) and the total-reflection region 32 as a shielding section. Therefore, three-dimensional display by a parallax barrier system in which the parallax barrier is equivalently disposed on a back surface of the display section 1 is performed.

On the other hand, in the case where two-dimensional display mode display is performed (refer to FIG. 6B), the display section 1 displays an image based on the two-dimensional image data, and controls the entire surface of the polymer diffuser plate 5 to be in the diffuse transmission mode. In this state, light rays from the light source 2 are reflected repeatedly in a manner of total-internal-reflection between the total-reflection region 32 of the first internal reflection plane 3A and the second internal reflection plane 3B in the light guide plate 3 to be guided from a side surface where the light source 2 is disposed to the other side surface facing the side surface and emitted from the other side surface. On the other hand, in the light guide plate 3, some light rays out of the total-reflection condition in the light rays L2 having entered the scattering region 31 of the first internal reflection plane 3A exit from the scattering region 31. In this case, light rays having exited through the scattering region 31 enter the polymer diffuser plate 5; however, the entire surface of the polymer diffuser plate 5 is in the diffuse transmission mode; therefore, light rays entering the display section 1 are diffused by the entire surface of the polymer diffuser plate 5. As a result, the whole light source device functions as a planar light source similar to a typical backlight. Therefore, two-dimensional display by a backlight system in which a typical backlight is equivalently disposed on a back surface of the display section 1 is performed.

(Third Embodiment)

Next, a stereoscopic display according to a third embodiment of the technology will be described below. It is to be noted that like components are denoted by like numerals as of the stereoscopic display according to the first or second embodiment, and will not be further described.

Figure 7A:
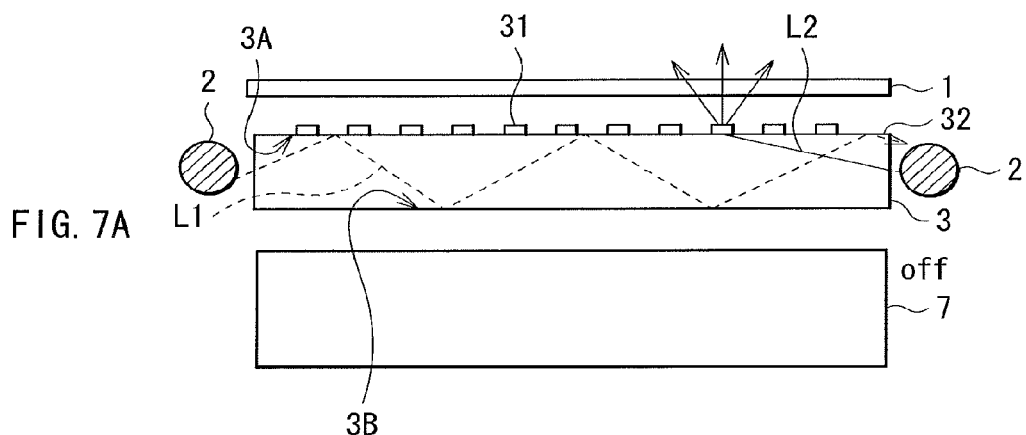
FIGS. 7A and 7B are sectional views illustrating a configuration example of a stereoscopic display according to a third embodiment of the technology with a state of light rays exiting from a light source device, where
Figure 7B:
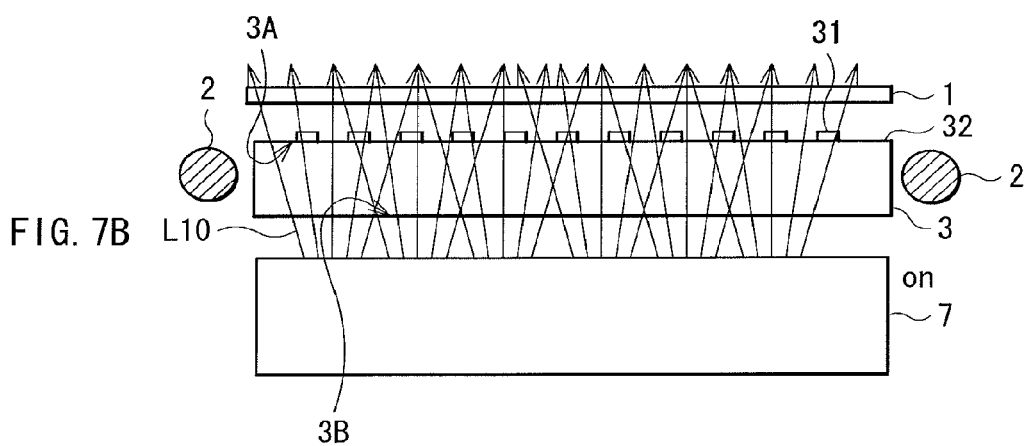

FIGS. 7A and 7B illustrate a configuration example of the stereoscopic display according to the third embodiment. As in the case of the stereoscopic display illustrated in FIGS. 1A and 1B, the stereoscopic display is allowed to selectively perform switching between the two-dimensional display mode and the three-dimensional display mode as necessary. FIGS. 7A and 7B correspond to a configuration in the three-dimensional display mode, and a configuration in the two-dimensional display mode, respectively. FIGS. 7A and 7B also schematically illustrate states of emission of light rays from the light source device in respective display modes.

In the stereoscopic display, the light source device includes a backlight 7 configured of a planar light source, instead of the electronic paper 4 in the stereoscopic display in FIGS. 1A and 1B. Other configurations are the same as those in the stereoscopic display in FIGS. 1A and 1B. The backlight 7 is another light source different from the light source 2 disposed on the side surface of the light guide plate 3, and is disposed to face a surface corresponding to the second internal reflection plane 3B of the light guide plate 3. The backlight 7 externally emits illumination light to the second internal reflection plane 3B. ON (light-on)/OFF (light-off) control of the backlight 7 is performed in response to switching between the two-dimensional display mode and the three-dimensional display mode.

In the case where the stereoscopic display performs three-dimensional display mode display (refer to FIG. 7A), the display section 1 displays an image based on the three-dimensional image data, and controls an entire surface of the backlight 7 to stay in an OFF (light-off) state. The light source 2 disposed on the side surface of the light guide plate 3 is controlled to stay in an ON (light-on) state. In this state, light rays from the light source 2 are reflected repeatedly in a manner of total-internal-reflection between the total-reflection region 32 of the first internal reflection plane 3A and the second internal reflection plane 3B in the light guide plate 3 to be guided from a side surface where the light source 2 is disposed to the other side surface facing the side surface and emitted from the other side surface. On the other hand, some light rays out of the total-reflection condition in the light rays L2 having entered the scattering region 31 of the first internal reflection plane 3A in the light guide plate 3 exit from the scattering region 31. In the scattering region 31, some other light rays are internally reflected, but the light rays exit through the second internal reflection plane 3B of the light guide plate 3, and do not contribute to display of an image. As a result, in the light guide plate 3, light rays exit only from the scattering region 31 of the first internal reflection plane 3A. In other words, the surface of the light guide plate 3 is allowed to equivalently function as a parallax barrier with the scattering region 31 as an opening section (slit section) and the total-reflection region 32 as a shielding section. Therefore, three-dimensional display by a parallax barrier system in which the parallax barrier is equivalently disposed on a back surface of the display section 1 is performed.

On the other hand, in the case where two-dimensional display mode display is performed (refer to FIG. 7B), the display section 1 displays an image based on the two-dimensional image data, and controls the entire surface of the backlight 7 to be in the ON (light-on) state. The light source 2 disposed on the side surface of the light guide plate 3 is controlled to be, for example, in the light off state. In this state, light rays from the backlight 7 enter the light guide plate 3 through the second internal reflection plane 3B at an angle substantially perpendicular to the light guide plate 3. Therefore, the incident angle of the light rays is out of the total-reflection condition in the total-reflection region 32, and the light rays exit from not only the scattering region 31 but also the total-reflection region 32. As a result, the light rays exit from the entire first internal reflection plane 3A of the light guide plate 3. In other words, the light guide plate 3 functions as a planar light source similar to a typical backlight. Therefore, two-dimensional display by a backlight system in which a typical backlight is equivalently disposed on a back surface of the display section 1 is performed.

It is to be noted that in the case where two-dimensional display mode display is performed, the light source 2 disposed on the side surface of the light guide plate 3 may be controlled to stay in the ON (light-on) state with the backlight 7. Moreover, in the case where the two-dimensional display mode display is performed, the light source 2 may perform switching between the light-off state and the light-on state as necessary. Therefore, for example, in the case where there is a difference in luminance distribution between the scattering region 31 and the total-reflection region 32 when only the backlight 7 is turned on, the luminance distribution on the entire surface is allowed to be optimized by appropriately adjusting the light state of the light source 2 (performing ON/OFF control or adjusting a light amount).

(Fourth Embodiment)

Next, a stereoscopic display according to a fourth embodiment of the technology will be described below. It is to be noted that like components are denoted by like numerals as of the stereoscopic displays according to the first to third embodiments, and will not be further described.

[Whole Configuration of Stereoscopic Display]

In the above-described first to third embodiments, the configuration example in which in the light guide plate 3, the scattering region 31 and the total-reflection region 32 are provided in the first internal reflection plane 3A is described; however, they may be provided in the second internal reflection plane 3B. For example, in the configuration in the above-described third embodiment (refer to FIGS. 7A and 7B), the scattering region 31 and the total-reflection region 32 may be provided in the second internal reflection plane 3B.

Figure 8:
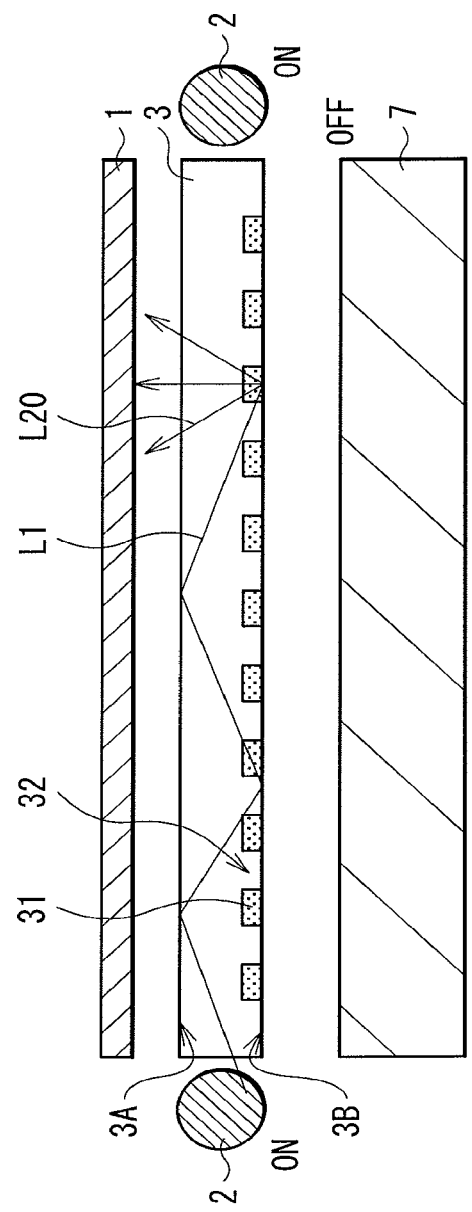
FIG. 8 is a sectional view illustrating a configuration example of a stereoscopic display according to a fourth embodiment of the technology with a state of light rays exiting from a light source device in the case where only a first light source is in an ON (light-on) state.
Figure 9:
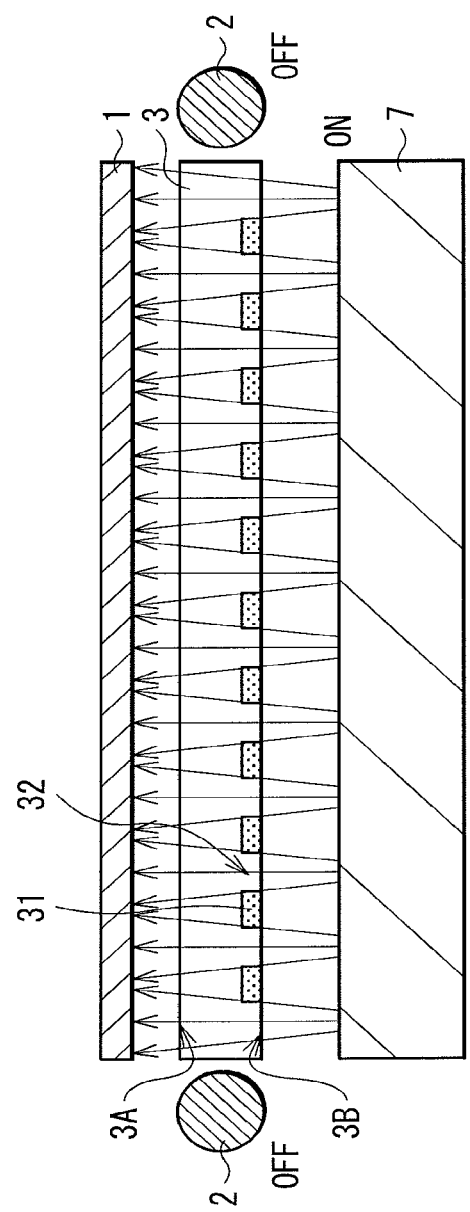
FIG. 9 is a sectional view illustrating a configuration example of the stereoscopic display illustrated in FIG. 8 with a state of light rays exiting from the light source device in the case where only a second light source is in an ON (light-on) state.
Figure 10:
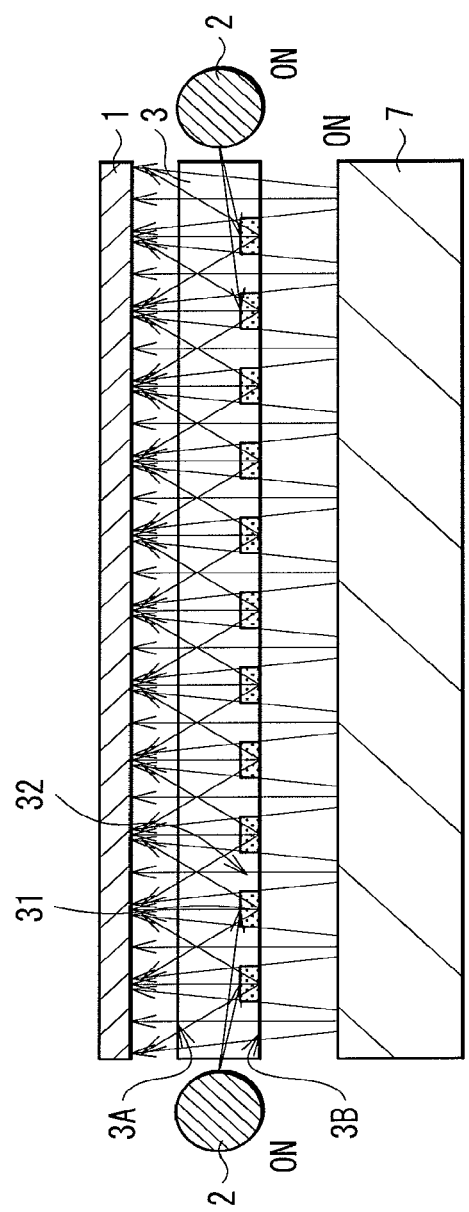
FIG. 10 is a sectional view illustrating a configuration example of the stereoscopic display illustrated in FIG. 8 with a state of light rays exiting from the light source device in the case where both of the first light source and the second light source are in an ON (light-on) state.

FIGS. 8 to 10 illustrate configuration examples of a stereoscopic display with such a configuration. The stereoscopic display is allowed to selectively perform switching between the two-dimensional display mode and the three-dimensional display mode as necessary by control of the light source similar to that in the stereoscopic display in FIG. 7. FIG. 8 schematically illustrates a state of light rays exiting from the light source device in the case where only the light source 2 is in the ON (light-on) state, and corresponds to the three-dimensional display mode. FIG. 9 schematically illustrates a state of light rays exiting from the light source device in the case where only the backlight 7 is in the ON (light-on) state, and corresponds to the two-dimensional display mode. Moreover, FIG. 10 schematically illustrates a state of light rays exiting from the light source device in the case where both of the light source 2 and the backlight 7 are in ON (light-on) state, and also corresponds to the two-dimensional display mode.

In the embodiment, the entire first internal reflection plane 3A of the light guide plate 3 is mirror-finished, and allows light rays incident at an incident angle satisfying the total-reflection condition to be reflected, in a manner of total-internal-reflection, in the interior of the light guide plate 3, and allows light rays out of the total-reflection condition to exit therefrom.

The second internal reflection plane 3B has the scattering region 31 and the total-reflection region 32. As will be described later, the scattering region 31 is formed by laser processing, sandblast processing or coating on a surface of the light guide plate 3 or bonding a sheet-like light-scattering member on the surface of the light guide plate 3. In the second internal reflection plane 3B, in the three-dimensional display mode, the scattering region 31 and the total-reflection region 32 function as an opening section (a slit section) and a shielding section of a parallax barrier for first illumination light (light rays L1) from the light source 2, respectively. In the second internal reflection plane 3B, the scattering region 31 and the total-reflection region 32 are arranged in a pattern forming a configuration corresponding to a parallax barrier. In other words, the total-reflection region 32 is arranged in a pattern corresponding to a shielding section in the parallax barrier, and the scattering region 31 is arranged in a pattern corresponding to an opening section in the parallax barrier. It is to be noted that as a barrier pattern of the parallax barrier, for example, a stripe pattern in which a large number of vertically long slit-like opening sections are arranged in parallel with shielding sections in between is known. However, as the barrier pattern, any of various known barrier patterns in related art may be used, and the barrier pattern is not specifically limited.

The first internal reflection plane 3A and the total-reflection region 32 of the second internal reflection plane 3B reflect light rays incident at the incident angle θ1 satisfying the total-reflection condition in a manner of total-internal-reflection (reflect light rays incident at the incident angle θ1 larger than a predetermined critical angle α in a manner of total-internal-reflection). Therefore, the first illumination light incident from the light source 2 at the incident angle θ1 satisfying the total-reflection condition is guided to a side surface direction in a manner of total-internal-reflection between the first internal reflection plane 3A and the total-reflection region 32 of the second internal reflection plane 3B. Moreover, as illustrated in FIG. 9 or FIG. 10, the total-reflection region 32 allows second illumination light from the backlight 7 to pass therethrough to emit the second illumination light as a light ray out of the total-reflection condition toward the first internal reflection plane 3A.

As illustrated in FIG. 8, the scattering region 31 scatters and reflects the first illumination light (light rays L1) from the light source 2, and emits a part or all (scattered light L20) of the first illumination light L1 toward the first internal reflection plane 3A as light rays out of the total-reflection condition.

[Specific Configuration Example of Scattering Region 31]

FIG. 11A illustrates a first configuration example of the second internal reflection plane 3B in the light guide plate 3. FIG. 11B schematically illustrates reflection and scattering states of light rays on the second internal reflection plane 3B in the first configuration example illustrated in FIG. 11A. In the first configuration example, the scattering region 31 is a recessed scattering region 31A with respect to the total-reflection region 32. Such a recessed scattering region 31A is allowed to be formed by, for example, sandblast processing or laser processing. For example, a surface of the light guide plate 3 is mirror-finished, and then a part corresponding to the scattering region 31A is subjected to laser processing to form the scattering region 31A. In the first configuration example, first illumination light L11 incident from the light source 2 at the incident angle θ1 satisfying the total-reflection condition is reflected in a manner of total-internal-reflection by the total-reflection region 32 of the second internal reflection plane 3B. On the other hand, even if light enters the recessed scattering region 31A at the same incident angle θ1 as in the case where light enters the total-reflection region 32, some light rays of first illumination light L12 having entered the recessed scattering region 31A do not satisfy the total-reflection condition on a side surface portion 33 of a recessed shape, and are scattered and pass through the side surface portion 33, and other light rays are scattered and reflected. As illustrated in FIG. 8, some or all of light rays (scattered light L20) scattered and reflected are emitted as light rays out of the total-reflection condition toward the first internal reflection plane 3A.

FIG. 12A illustrates a second configuration example of the second internal reflection plane 3B of the light guide plate 3. FIG. 12B schematically illustrates reflection and scattering states of light rays on the second internal reflection plane 3B in the second configuration example illustrated in FIG. 12A. In the second configuration example, the scattering region 31 is a projected scattering region 31B with respect to the total-reflection region 32. Such a projected scattering region 31B is allowed to be formed, for example, by molding a surface of the light guide plate 3 by a die. In this case, a part corresponding to the total-reflection region 32 is mirror-finished by a surface of the die. In the second configuration example, the first illumination light L11 incident from the light source 2 at the incident angle θ1 satisfying the total-reflection condition is reflected in a manner of total-internal-reflection by the total-reflection region 32 of the second internal reflection plane 3B. On the other hand, even if light enters the projected scattering region 31B at the same incident angle θ1 as in the case where light enters the total-reflection region 32, some light rays of first illumination light L12 having entered the projected scattering region 31B do not satisfy the total-reflection condition on a side surface portion 34 of a projected shape, and are scattered and pass through the side surface portion 34, and other light rays are scattered and reflected. As illustrated in FIG. 8, some or all of light rays (scattered light L20) scattered and reflected are emitted as light rays out of the total-reflection condition toward the first internal reflection plane 3A.

FIG. 13A illustrates a third configuration example of the second internal reflection plane 3B of the light guide plate 3. FIG. 13B schematically illustrates the reflection and scattering states of light rays on the second internal reflection plane 3B in the third configuration example illustrated in FIG. 13A. In the configuration examples in FIGS. 11A and 12A, the surface of the light guide plate 3 is processed into a geometry different from that of the total-reflection region 32 to form the scattering region 31. On the other hand, in a scattering region 31C in the configuration example in FIG. 13A, instead of processing the surface of the light guide plate 3, a light-scattering member 35 made of a material different from that of the light guide plate 3 is disposed on a surface, corresponding to the second internal reflection plane 3B, of the light guide plate 3. In this case, a white paint (for example, barium sulfate) as the light-scattering member 35 is patterned on the surface of the light guide plate 3 by screen printing to form the scattering region 31C. In the third configuration example, the first illumination light L11 incident from the light source 2 at the incident angle θ1 satisfying the total-reflection condition is reflected by the total-reflection region 32 of the second internal reflection plane 3B in a manner of total-internal-reflection. On the other hand, even if light enters the scattering region 31C where the light-scattering member 35 is disposed at the same incident angle θ1 as in the case where light enters the total-reflection region 32, a part of the first illumination light L12 having entered the scattering region 31C is scattered and passes through the scattering region 31C by the light-scattering member 35, and the other is scattered and reflected. Some or all of light rays scattered and reflected are emitted as light rays out of the total-reflection condition toward the first internal reflection plane 3A.

[Operation of Stereoscopic Display]

In the case where the stereoscopic display performs three-dimensional display mode display, the display section 1 displays an image based on the three-dimensional image data, and ON (light-on)/OFF (light-off) control of the light source 2 and the backlight 7 is performed for three-dimensional display. More specifically, as illustrated in FIG. 8, the light source 2 is controlled to stay in an ON (light-on) state, and the backlight 7 is controlled to stay in an OFF (light-off) state. In this state, first illumination light (light rays L1) from the light source 2 is reflected repeatedly in a manner of total-internal-reflection between the first internal reflection plane 3A and the total-reflection region 32 of the second internal reflection plane 3B in the light guide plate 3 to be guided from a side surface where the light source 2 is disposed to the other side surface facing the side surface and emitted from the other side surface. On the other hand, a part of the first illumination light from the light source 2 is scattered and reflected by the scattering region 31 of the light guide plate 3 to pass through the first internal reflection plane 3A of the light guide plate 3 and exit from the light guide plate 3. Therefore, the light guide plate 3 is allowed to have a function as a parallax barrier. In other words, for the first illumination light from the light source 2, the light guide plate 3 is allowed to equivalently function as a parallax barrier with the scattering region 31 as an opening section (slit section) and the total-reflection region 32 as a shielding section. Therefore, three-dimensional display by a parallax barrier system in which the parallax barrier is equivalently disposed on a back surface of the display section 1 is performed.

On the other hand, in the case where two-dimensional display mode display is performed, the display section 1 displays an image based on the two-dimensional image data, and ON (light-on)/OFF (light-off) control of the light source 2 and the backlight 7 is performed for two-dimensional display. More specifically, for example, as illustrated in FIG. 9, the light source 2 is controlled to stay in an OFF (light-off) state, and the backlight 7 is controlled to stay in an ON (light-on) state. In this case, second illumination light from the backlight 7 passes through the total-reflection region 32 of the second internal reflection plane 3B to exit as a light ray out of the total-reflection condition from substantially the entire first internal reflection plane 3A. In other words, the light guide plate 3 functions as a planar light source similar to a typical backlight. Therefore, two-dimensional display by a backlight system in which a typical backlight is equivalently disposed on a back surface of the display section 1 is performed.

It is to be noted that when only the backlight 7 is turned on, the second illumination light exits from substantially the entire surface of the light guide plate 3, and if necessary, the light source 2 may be turned on as illustrated in FIG. 10. Therefore, for example, in the case where there is a difference in luminance distribution between parts corresponding to the scattering region 31 and the total-reflection region 32 when only the backlight 7 is turned on, the luminance distribution on an entire surface is allowed to be optimized by appropriately adjusting the light state of the light source 2 (performing ON/OFF control or adjusting a light amount). However, for example, in the case where luminance is sufficiently corrected in the display section 1 in two-dimensional display, only the backlight 7 may be turned on.

As described above, in the stereoscopic display using the light source device according to the embodiment, the scattering region 31 and the total-reflection region 32 are provided in the second internal reflection plane 3B of the light guide plate 3, and the first illumination light from the light source 2 and the second illumination light from the backlight 7 are allowed to selectively exit from the light guide plate 3; therefore, the light guide plate 3 is allowed to equivalently function as a parallax barrier.

(Other Embodiments)

The present technology is not limited to the above-described embodiments, and may be variously modified. For example, in the above-described embodiments, configuration examples in which in the light guide plate 3, the scattering region 31 and the total-reflection region 32 are provided in one of the first internal reflection plane 3A and the second internal reflection plane 3B are described; however, the scattering region 31 and the total-reflection region 32 may be provided in both of the first internal reflection plane 3A and the second internal reflection plane 3B.

Moreover, in the above-described embodiments, the case where switching between three-dimensional display and two-dimensional display is selectively performed on an entire screen is described; however, selective switching between three-dimensional display and two-dimensional display may be controlled for each of partial regions thereof. In other words, three-dimensional display may be performed on one region in one screen, and two-dimensional display may be performed on another region. In three-dimensional display, resolution declines, compared to the case of two-dimensional display; therefore, in some cases, two-dimensional display is preferable in visibility of an image. For example, in the case where a film with subtitles is three-dimensionally displayed, the subtitles are easily viewed by performing two-dimensional display on only a region where subtitles are to be displayed. Moreover, it is considered that in a portable terminal device such as a cellular phone, while two-dimensional display is performed on only a region where an icon or the like indicating signal strength or a battery level is displayed, three-dimensional display is performed on another region.

To control such switching, for each of partial regions, between three-dimensional display and two-dimensional display, in the display section 1, each of partial regions selectively displays one of a three-dimensional image based on three-dimensional image data and a two-dimensional image based on two-dimensional image data. Moreover, an optical device allowed to control, for each of partial region thereof, the state of light rays exiting therefrom is used.

More specifically, in the case where the electronic paper 4 is used as the optical device as in the case of the configuration example in FIGS. 1A and 1B, the electronic paper 4 is controlled to switch, for each of partial regions thereof, a function performed on an incident light ray in a part corresponding to a region where three-dimensional display is performed in the display section 1 to a light absorption mode (a black display mode), and to switch a function performed on an incident light ray in a part corresponding to a region where two-dimensional display is performed in the display section 1 to a scattering-reflection mode (a white display mode). Moreover, in the case where the polymer diffuser plate 5 is used as the optical device as in the case of the configuration example illustrated in FIGS. 6A and 6B, the polymer diffuser plate 5 is controlled to switch, for each of partial region thereof, a function performed on an incident light ray in a part corresponding to a region where three-dimensional display is performed in the display section 1 to a transparent transmission mode, and to switch a function performed on an incident light ray in a part corresponding to a region where two-dimensional display is performed in the display section 1 to a diffuse transmission mode. Further, in the case where the backlight 7 is used as the optical device as in the case of the configuration example illustrated in FIGS. 7A and 7B or FIGS. 8 to 10, as the backlight 7, a backlight allowed to control lighting for each of partial regions is used. Then, in the display section 1, in the backlight 7, a part corresponding to a region where three-dimensional display is performed is controlled to be a light-off (OFF) state, and a part corresponding to a region where two-dimensional display is performed in the display section 1 is controlled to stay in a light-on (ON) state.

The present application contains subject matter related to that disclosed in Japanese Priority Patent Application 2011-15569 filed in the Japan Patent Office on Jan. 27, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A display device comprising a display section and a light source device, the light source device including:
   a light guide plate having a first plane and a second plane which face each other;
   one or more light sources each disposed beside the light guide plate along a side surface thereof; and
   an optical device disposed to face the second plane,
   wherein the display section is disposed to face the first plane,
   one or both of the first plane and the second plane of the light guide plate each have regions each allowing a part of light from the light sources to exit from the light guide plate, and
   at least a part of the optical device corresponding to a region of the display section performing a three-dimensional display is controlled to stay in a light-off state.

2. The display device according to claim 1, wherein other part of the optical device corresponding to a region of the display section performing a two-dimensional display is controlled to stay in a light-on state.

3. The display device according to claim 1, wherein one or both of the first plane and the second plane of the light guide plate each have reflecting regions and the scattering regions.

4. The display device according to claim 3, wherein reflecting regions and the scattering regions are alternately arranged in one or both of the first and second internal reflection planes.

5. The display device according to claim 3, wherein
the scattering region is formed by processing a surface of the light guide plate into a geometry different from that of the reflecting region, the surface corresponding to the first internal reflection plane or the second internal reflection plane.

6. The display device according to claim 3, wherein
the scattering region is formed by disposing, on a surface of the light guide plate, a light-scattering member with a refractive index higher than that of the light guide plate, the surface corresponding to the first internal reflection plane or the second internal reflection plane.

7. A display device comprising a display section and a light source device, the light source device including:
a light guide plate having a first plane and a second plane which face each other;
one or more light sources each disposed beside the light guide plate along a side surface thereof; and
an optical device disposed to face the second plane,
wherein the display section is disposed to face the first plane,
one or both of the first plane and the second plane of the light guide plate each have regions each allowing a part of light from the light sources to exit from the light guide plate, and
at least a part of the optical device corresponding to a region of the display section displaying parallax images is controlled to stay in a light-off state.

8. The display device according to claim 7, wherein one or both of the first plane and the second plane of the light guide plate each have reflecting regions and the scattering regions.

9. The display device according to claim 8, wherein reflecting regions and the scattering regions are alternately arranged in one or both of the first and second internal reflection planes.

10. The display device according to claim 8, wherein
the scattering region is formed by processing a surface of the light guide plate into a geometry different from that of the reflecting region, the surface corresponding to the first internal reflection plane or the second internal reflection plane.

11. The display device according to claim 8, wherein
the scattering region is formed by disposing, on a surface of the light guide plate, a light-scattering member with a refractive index higher than that of the light guide plate, the surface corresponding to the first internal reflection plane or the second internal reflection plane.

12. A display device comprising:
a display panel configured to display a plurality of parallax images;
a light guide plate having a first plane and a second plane which face each other; and
one or more light sources each disposed beside the light guide plate along a side surface thereof,
wherein the display section is disposed to face the first plane,
one or both of the first plane and the second plane of the light guide plate each have regions each allowing a part of light from the light sources to exit from the light guide plate,
at least one of the first plane and the second plane of the light guide plate has a plurality of regions configured to exit a part of light from the light guide plate within 1 millimeter cycle corresponding to the parallax images.

* * * * *